Figure 1:
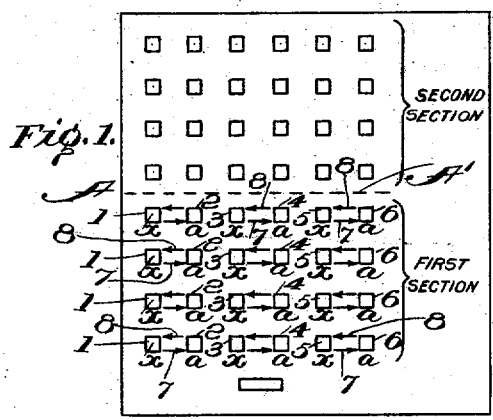

No. 886,630. PATENTED MAY 5, 1908.
A. E. OSBORNE.
SCHOOL ROOM CHART.
APPLICATION FILED SEPT. 12, 1907.

3 SHEETS—SHEET 1.

WITNESSES

INVENTOR
A. E. Osborne
BY
ATTORNEY

No. 886,630. PATENTED MAY 5, 1908.
A. E. OSBORNE.
SCHOOL ROOM CHART.
APPLICATION FILED SEPT. 12, 1907.
3 SHEETS—SHEET 2.
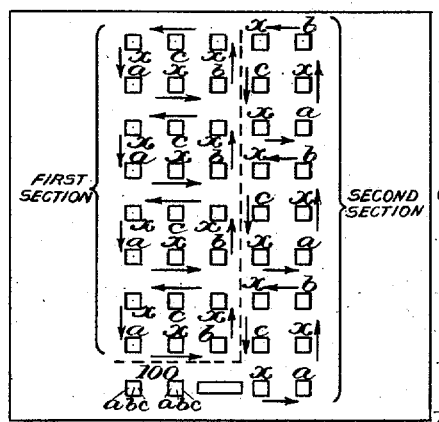
Fig. 7.
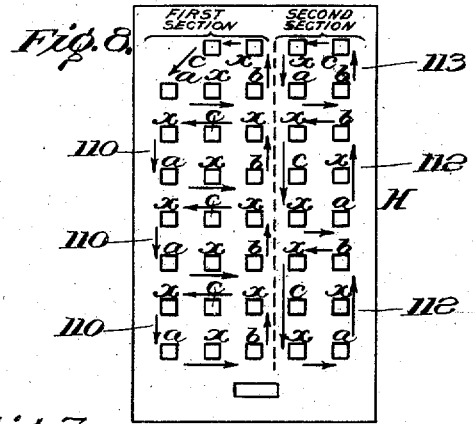
Fig. 8.
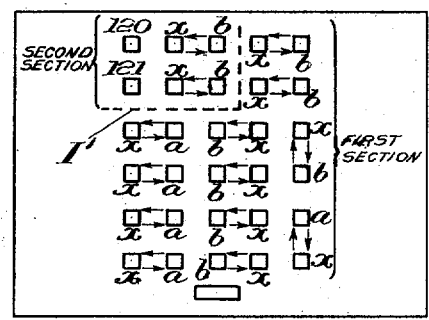
Fig. 9.
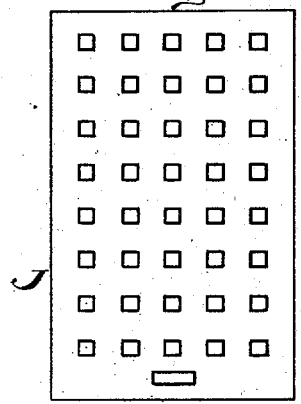
Fig. 10.
Fig. 11.
Fig. 12.
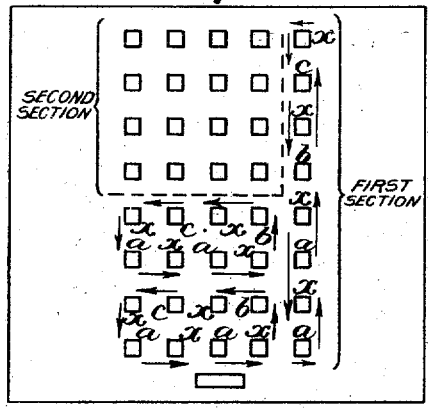
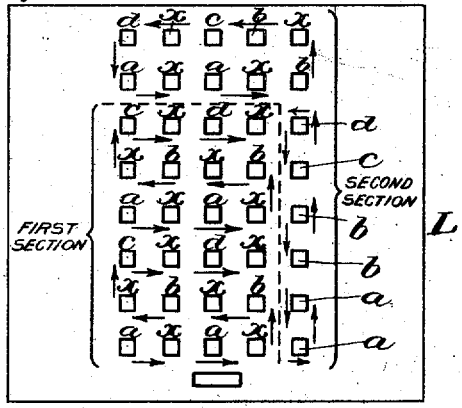
WITNESSES
Allan H. Foose.
S. Richards
INVENTOR
A. E. Osborne
BY
Wm. H. Megrath
ATTORNEY No. 886,630. PATENTED MAY 5, 1908.
A. E. OSBORNE.
SCHOOL ROOM CHART.
APPLICATION FILED SEPT. 12, 1907.

3 SHEETS—SHEET 3.

UNITED STATES PATENT OFFICE.

ALBERT E. OSBORNE, OF NEW YORK, N. Y., ASSIGNOR TO UNDERWOOD & UNDERWOOD, OF ARLINGTON, NEW JERSEY, A CORPORATION OF NEW JERSEY.

SCHOOL-ROOM CHART.

No. 886,630.      Specification of Letters Patent.      Patented May 5, 1908.

Application filed September 12, 1907. Serial No. 392,447.

*To all whom it may concern:*

Be it known that I, ALBERT E. OSBORNE, a citizen of the United States, and a resident of the city, county, and State of New York, have invented certain new and useful Improvements in School-Room Charts, of which the following is a specification.

As a means for graphically illustrating a subject the stereograph and its complement, the stereoscope, have well known advantages as they give a full, clear and accurate view of the subject incomparably superior to that which may be obtained from any other character of illustration.

It will therefore be apparent that a system which renders practical the systematic use of stereographs in schools and classes in the illustration of a subject being studied, or as the basis for the study of such a subject, will be of the utmost importance in that it will render the subject clear and make its study interesting to the scholars.

The present invention, therefore, relates to educational appliances and it has for its particular object the provision of a means which will render practicable the systematic use of stereographs and stereoscopes in certain studies in schools or classes, among which studies geography may be cited as a leading example.

The present system in its complete form, as now devised, comprises, in addition to the stereoscopes and stereographs, certain books for the teacher and scholars, bearing upon the matter depicted by the stereographs. These books are preferably designated "*Teacher's Manual*" and "*Student's Stereoscopic Field Guide*" respectively. In them the matter is arranged systematically under a series of headings or topics, and these topics are subdivided into a series of "sub-topics", each for one class period, for example, which may be illustrated by a predetermined uniform number of stereographs, twelve preferred. These groups of twelve stereographs are made up in different ways according to the requirements of different lessons or topics being studied. Thus, in some instances, the stereographs are all duplicates of each other, the particular topic or lesson being amply illustrated by one stereograph. In other instances there may be two views required, in which event there will be six duplicates of each of the stereographs, and in still other cases there may be four duplicates of each of three different stereographs, or three duplicates of each of four different stereographs, and so on. The class, with this particular number of stereographs, for the study of the lesson is conveniently and preferably composed of 24 members, and where the room contains more than that number of scholars, it will be best to divide it into a first and second section, arbitrarily so called; the first section containing 24 pupils and the second the remaining number of pupils. These sections study the lesson at different times, each pursuing the study without the assistance of the teacher, while the other section, under the care of the teacher, is reciting the same or any other lesson. By purchasing twice the equipment, the scheme could be used without dividing the class.

The section which is studying the lesson with the stereographs and stereoscopes, the "first section" for example is divided into groups of two or more members each, according to the number of different views illustrating the particular lesson or topic, and all or certain members of these several groups are provided with the "*Student's Guide*" while others are provided with the stereoscopes and stereographs. If only part of the section is supplied with books then at predetermined times an exchange is made between the members of the groups, the scholars having the "guides" handing them to the scholars having the stereoscopes and stereographs and receiving the latter in exchange. If all are provided with "guides" then at these times the stereographs are passed along. Thus in either case each scholar has an opportunity to study the matter embodied in the guide and to study the stereographs illustrative of or bearing upon that matter, without necessitating a separate stereoscope and stereograph for each individual scholar in the class. The system, therefore, makes the use of stereographic illustration practicable, by avoiding the expense, which in many cases would be prohibitive, of a larger number of stereoscopes and sets of stereographs. To be fully practicable, however, the system must be sufficiently elastic in respect of the particular groupings and times and methods of exchange, to suit varying requirements incident to different numbers of scholars in the class, different arrangement of desks in the room and the varying numbers of different views required by different lessons or topics; and these various groupings of pupils and the times of making the exchanges, together with the proper person with whom the exchange is to be effected, must be explained in order that the system may be understood and the exchanges systematically and properly made, so as to avoid loss of time and confusion. To graphically convey such information, there has been devised as a part of the system, or as a means for use therewith, a chart, or series of charts, constituting in a sense a plan of the school room and having thereon indicia showing the groupings of the pupils in using the system and the direction of exchanging books and stereographs, or of simply passing on the stereographs (with the complement stereoscopes).

The leading feature of the present invention consists, therefore, in the charts to be used in or with the system, and a series of such charts exemplifying the present invention are shown in the accompanying drawings, and will be hereinafter described in detail. It is to be understood, however, that the invention is not restricted to the details illustrated, and that many changes and many apparently widely different variations of the invention in addition to the forms herein illustrated may be made without departing from the spirit of the invention or the scope of the subjoined claims.

Figure 14:
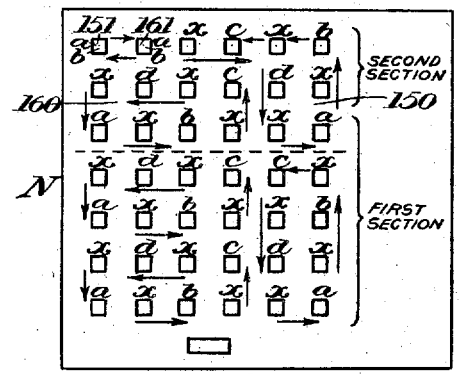
Figure 15:
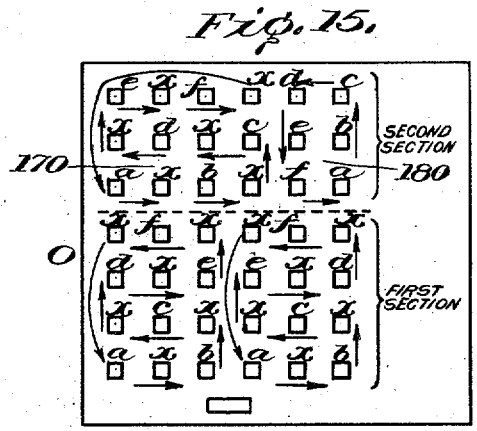
Figure 16:
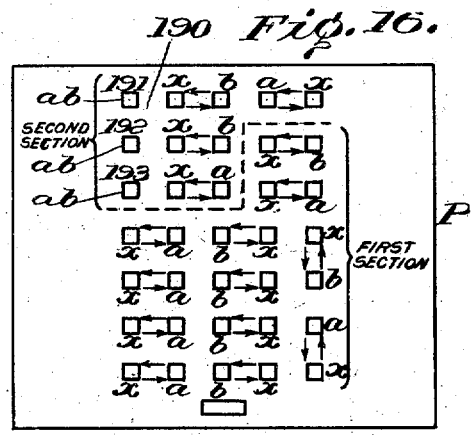

In the accompanying drawings: Figures 1 to 5, inclusive, illustrate a set of charts for a room having 48 desks arranged in eight cross rows of six desks each, these charts showing the various systems of groupings and exchange when there are twelve duplicates of one stereoscope, six duplicates of each of two stereoscopes, four duplicates of each of three stereoscopes, three duplicates of each of four stereoscopes, and two duplicates of each of two stereoscopes, respectively. Fig. 6 is a view of a chart particularly intended to show the division when there are 36 desks arranged in six rows of six desks each. Fig. 7 is a view of a chart particularly intended to show the division when there are 44 desks arranged in eight rows of five desks each and one row of four desks. Fig. 8 is a view of a chart particularly intended to show the division when there are 39 desks arranged in seven rows of five desks each and one row of four desks. Fig. 9 is a view of a chart particularly intended to show the division where there are 30 desks arranged in six rows of five desks each. Figs. 10, 11, 12 and 13 are diagrams or charts to be used in rooms containing 40 desks arranged in eight rows of five desks each. Figs. 14 and 15 are views of charts to be used in rooms having 42 desks arranged in seven rows of six desks each. Fig. 16 is an example of a chart for a room having 35 pupils.

The same reference character indicates the same part in the several diagrams or charts.

In each of the following figures there is shown a chart constituting in a sense, a plan of the school room, having illustrated thereon the number and positions of the desks in the room and suitable indicia by which is disclosed the division of the room into sections for separate study of the lesson, the proper groupings of the scholars and the proper directions of exchange, together with the original distribution of stereographs appropriate to the lesson being studied. The indicia referred to consists of a series of symbols of any appropriate character. As shown in all the charts, the symbols representing the desks or pupils are squares or rectangles, and these squares are provided with letters which respectively represent the stereographs, one letter being used uniformly for a stereograph of the series. The symbols which divide the chart into the groups are arrows having their heads pointed in the direction in which the exchange of stereographs, with the stereoscopes, is to be effected. These particular symbols while they are preferred because they are simple and clearly and graphically disclose the matter intended, yet may be varied without departing from the spirit of the invention.

Having thus in a general way set forth the main features of the invention, I will now proceed to describe it in detail by reference to the accompanying drawings and to the characters of reference thereon.

In Figs. 1 to 5, inclusive, there are shown as already stated, a series of charts, A, B, C, D and E, respectively, for a room having 48 pupils with indicia appropriate to various numbers of different stereographs employed to illustrate several lessons or topics of the lesson. As stated, it is preferred to divide the room into two classes or sections for separate study of the lesson, and to have one of said classes or sections consist of 24 pupils. This division is indicated on the charts by the lines A', B', C', D' and E' respectively, which may run longitudinally or transversely of the charts, or in any other suitable manner. If desired, any additional symbol, or the words "first section" and "second section" (as shown) may be printed or otherwise suitably delineated on or opposite to the respective sections to convey the meaning intended.

Referring now particularly to Fig. 1, it will be seen that a series of rows of squares 1, 2, 3, 4, 5 and 6 represent the desks, or the pupils, and that each square 1, 3 and 5 contains the symbol $x$, while each square 2, 4 and 6 contains the symbol $a$. This symbol $x$ has been arbitrarily selected to represent the interval for the pupil's use of the book, said book being hereinbefore referred to as entitled "Student's Stereoscopic Guide"; while the symbol a has been arbitrarily selected to represent in each case a particular stereograph of the topic or lesson being studied. The squares are connected with each other in groups of two squares each, by two arrows 7 and 8 between each pair of squares, one arrow, as 7, having its head pointing to one square of the group, while the other arrow has its head pointing to the other square of the group. These arrows constitute a convenient means for separating the squares into groups (each herein composed of two members 1 and 2, 3 and 4, or 5 and 6) and to show the direction of exchange of stereographs. It will now be apparent that the chart A shows, among other things, that the lesson or topic has twelve different copies of one stereograph and that these copies are to be first distributed to the pupils in the second, fourth and sixth rows, and that the books are to be first distributed to all the pupils or to those in the first, third and fifth rows; that each group consists of two pupils and the exchange of stereograph or stereograph and book is from one to the other. The study period may conveniently consist of 30 minutes, in which case this exchange may be made in two and one-half or five minutes; and if the same stereograph is to be used throughout the entire lesson, the exchange may be made 12 or 6 times in the study period, the student thus alternately studying the book and the stereographs said number of times in the lesson period.

Figure 2:
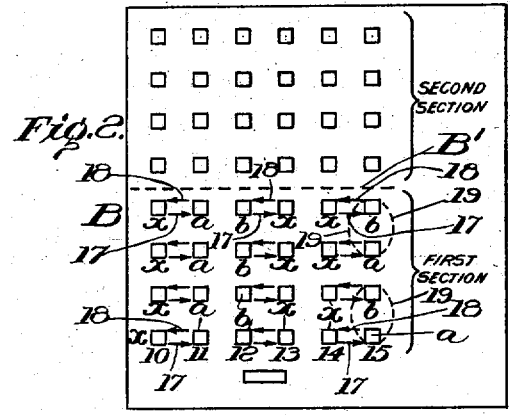

The next topic or lesson may have two different stereogrpahs, in which event there will be 6 duplicate copies of each. For this topic or lesson the chart B illustrated in Fig. 2 is used, and it indicates upon its face its applicability to such condition; the squares, here designated 10 to 15 inclusive, representative of the pupils, being provided with indicia of two different stereographs as well as of intervals for the study of books, one row, as 11, indicating one view by the character a, another row as 12, indicating another stereograph by the character b, another row as 15, indicating the alternative distribution of the stereographs by the alternate arrangement of the two characters a and b, and all the other rows indicating that the pupils therein are to be studying their books, by the symbol x. The arrows 17 and 18 show the groupings and the method of exchange (between the members thereof) which particular exchange may be effected every two and one-half minutes, as before; but in order that each scholar may study each stereograph, it is necessary to effect an exchange of stereographs between the groups, and this exchange may be effected in the middle of the class period by a pupil of one pair having a stereograph a passing the same to a pupil in the neighboring pair having a stereograph b, and receiving said stereograph b in return. This exchange is conveniently indicated by the symbols 19 herein shown arbitrarily as composed of broken lines.

Figure 3:
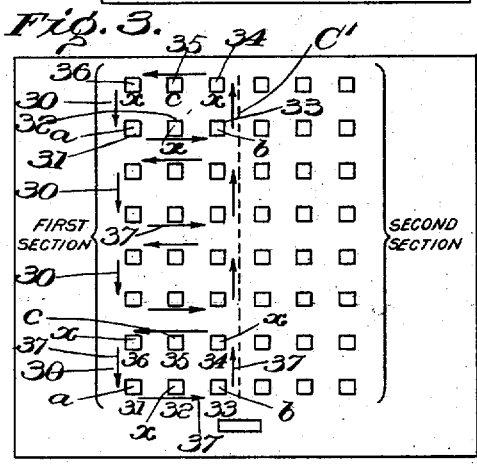

The chart C illustrated in Fig. 3, is intended for use for a topic or lesson requiring three different stereographs and having four different copies of each. In this chart the first and second sections are preferably divided on what will be arbitrarily assumed to be a longitudinal line C', and the sections are subdivided into four groups 30 of six pupils each. The squares of each group have three numbers 31, 33 and 35, respectively, provided with symbols a, b and c (indicating three different stereographs and the original distribution thereof), while the other three members 32, 34 and 36 of each group, are supplied with the symbol x, representing indexes for study of the books as before. As shown by the arrows 37, the exchange of the stereographs, which may be effected every two and one-half or five minutes during a class period of thirty minutes, is made by passing the stereographs and stereoscopes from 36 to 31, 31 to 32, 32 to 33, 33 to 34, 34 to 35 and 35 to 36. Proper repetition of this exchange gives each scholar access to each stereograph one or more times according to the length of the study period and interval of exchange.

Figure 4:
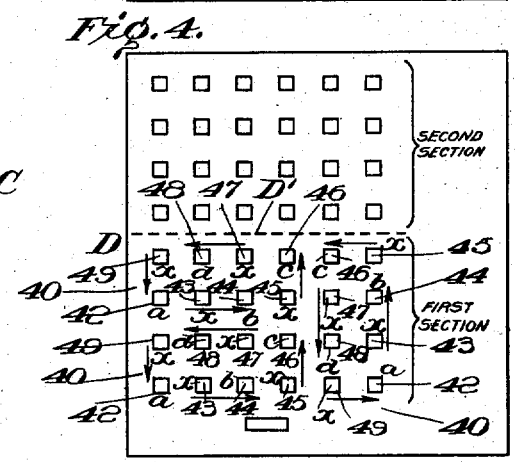

In the chart D, shown in Fig. 4, a system of exchange for a lesson or topic having three duplicate copies of each of four different stereographs is indicated by the provision of the squares with the symbols a b c and d. In this event, as shown by the chart, the first section is divided into three groups 40, of eight members each, by the arrows 41, and four members of each group are provided with the different stereographs respectively, either all the pupils or only while the other four members, arranged to alternate with those just referred to, are provided with the books. This is shown by providing squares, 42, 44, 46 and 48 with the symbols a b c and d respectively, and the squares 43, 45, 47 and 49 with the symbol x. The arrows show that the exchange of stereographs or stereoscopes and books is progressively from 42 to 43, 43 to 44, and so on the pupil at 42 receiving the book from the pupil at 49. The exchange is made every three and three-quarters minutes in a study period of thirty minutes.

Figure 5:
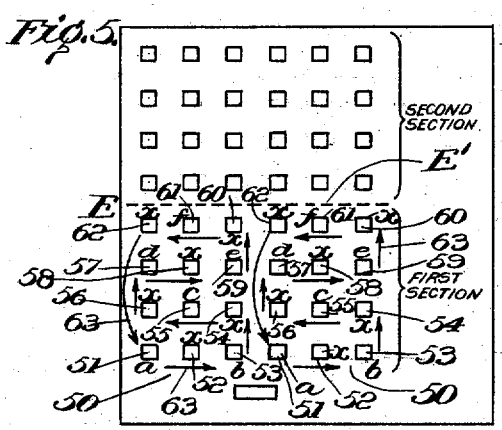
Figure 6:
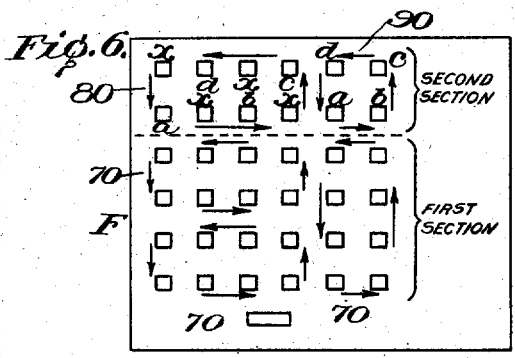
Figure 13:
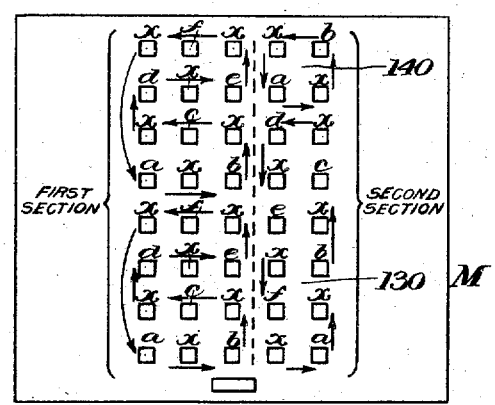

The chart E, shown in Fig. 5, is intended for a lesson or topic having two duplicate copies of each of six different stereographs. In this case, the chart is divided by arrows 63 into groups 50 of twelve members each, designated 51 to 62 both inclusive. Squares 51, 53, 55, 57, 59 and 61 are provided with the symbols a b c d e and f, indicating that the pupils they represent are provided with six different stereographs, respectively, while the symbol $x$ shows that the pupils represented by the other squares are each to be using a guide. The arrows 63 not only show that the pupils are divided into groups of twelve, but also show that the exchange of stereographs is made by the pupil at 51 passing the stereograph and stereoscope to the pupil at 52, the pupil at 53 passing the stereograph which he has been examining and the stereoscope, to the pupil at 54, and so on. This exchange may be made every two and one-half minutes.

In all the foregoing stereographs the first section only is shown as provided with the symbols, but it will be understood that both sections may be thus provided if desired. It will also be understood that if desired the second section may be omitted from the chart entirely, the latter thus delineating only the section of the class which is actually pursuing the study, and not the entire room where the latter is divided into different classes or sections for separate study of the lesson.

Assuming that the room contains thirty-six pupils, a chart or set of charts disclosing such number and the arrangement of the pupils is employed. The groupings for the studies which call for 12 duplicates of one stereograph or 6 duplicates of 2 stereographs, or 4 duplicates of 3 stereographs, or 2 duplicates of six stereographs, may be identical with those shown in Figs. 1, 2, 3 and 5 respectively, the grouping in such cases being divisors of 36 as well as 48. When however 3 duplicates of 4 different stereographs are employed the chart F shown in Fig. 6 is used. In this chart the first section is divided into groups 70 of 8 numbers each as in Fig. 4. There being only 12 desks or pupils in the second section it is divided into two groups 80 and 90. One of these groups as 80, has eight members four of whom have at first intervals for study of the books, as indicated by $x$, while the other four are provided with the different stereographs, as indicated by $a$ $b$ $c$ and $d$, and with the stereoscopes. The other group, 90, has only four members and each of these may be provided with a stereograph and stereoscope, as well as with a book. The direction of exchange of stereographs is indicated by the arrows and will be understood from the foregoing description.

In Figs. 7 and 8 the charts (designated G and H) represent plans of groupings and changes for topics, requiring 4 duplicate copies of 3 different stereograph, in groups having 44 and 39 desks, respectively, arranged in 7 rows of five seats and one row of four. In the chart shown in Fig. 7, there are indicated four groups of 6 members each in the first section, and three groups of 6 members each and one group of two members in the second section. In these groups of six members each the distribution of stereographs etc. and the exchange thereof are, as indicated, like those in Fig. 3. The other group, designated 100, has only two members and each is provided with one each of the stereographs as indicated by the symbols $a$ $b$ and $c$ thereon.

In the chart II in Fig. 8 the arrangement is such that in the first section three groups (100) will consist of six pupils each, and the other group will consist of five pupils; while in the second section two groups 112 will consist of six pupils each while the other group 113 will consist of four pupils. As between the pupils in the groups having six pupils the exchange indicated will be made in the same manner as in Fig. 3. In the group having five pupils, and also in the group having four pupils the exchange will be progressively from one to the other as indicated. There being only 16 members in the second section it is apparent that one of the duplicate sets of the stereograph will not be used when this section is pursuing this study. Assuming that there are thirty pupils arranged in 6 rows of 5 pupils each, and that six copies of each of two different views are employed, the chart I shown in Fig. 9 is preferably employed. In this chart the second section is shown as separated from the first section by a line I' which extends around the 6 desks in the corner of the room. The indicia on this chart shows that the grouping and exchange is like that already explained with reference to Fig. 2, except that two pupils 120 and 121 in the second section each are provided with the two different stereographs. It will be apparent that where the room consists of 24 desks only it will not be necessary to divide the classes into first and second sections.

In some cases the studies have an unequal number of duplicates of the various stereographs. A few typical charts exemplifying arrangements to suit this condition are illustrated in Figs. 10, 11 and 12. In each of these figures it is assumed that the room has 40 seats arranged in 8 rows of 5 seats each, and is divided into two sections of 24 and 16 desks each. Assuming that there are two different stereographs and eight duplicates of one and four duplicates of the other, the chart J (Fig. 10) is preferred. In this chart the first section is divided into four groups of six pupils each and one group of four pupils. The distribution of the stereographs, and the mode of exchange are indicated by the symbols. As the stereographs are passed progressively from one to another and as there are twice the number of duplicates of one as of the other it is apparent that the former will be viewed twice as often by each scholar as the series of lesser number.

The chart K (Fig. 11) shows the system of grouping and exchange preferred where three different stereographs are employed, with six duplicates of one and three duplicates of each of the others. In this case the chart is divided into groups of four numbers, all these members or only two are to be provided with the book and the other two with the stereographs and stereoscopes, distributed as indicated by the symbols thereon, which has already been sufficiently described. The exchange is made practically the same as in the system having three duplicates of each of four different stereographs, but it is apparent that the stereographs having six duplicates is viewed twice as often as those having only three duplicates.

The indicia on the chart Fig. 12, shows that it is for use where four different stereographs are employed with four duplicates of each of two of the same and two duplicates of each of the other two. In this case the first section is divided into two groups of twelve pupils each, all or only six of whom are originally provided with books, two others are provided with duplicates of the stereographs of which there are four duplicates, two more are provided with duplicates of the other stereograph of which there are four duplicates and the remaining two pupils respectively provided with different stereographs of the two series having two duplicates. The exchange (as indicated by the arrows) is made practically the same as when six different stereographs with two duplicates of each is employed. It is apparent that the stereographs having four duplicates will be viewed twice as often as those having two duplicates only. The second section is divided into two groups one of which has ten members and the other of which has six members. All the members or only four are to be originally provided with the books, two are to be originally provided with duplicates of the stereographs of which there are four duplicate copies, while the remaining two pupils are to be provided with the respective stereographs of which there are two duplicates only. The remaining group of this section contains six members only and the indicia on the chart shows that each will be provided with a stereograph and stereoscope, there being two duplicate copies of each of two stereoscopes and one of each of the other two stereographs remaining of the set, and these are distributed as indicated.

Where there are forty pupils arranged in 8 rows of 5 pupils each, and the lesson calls for two duplicates of six different stereographs, the chart M (Fig. 13) is preferably employed. In this the first section is like the first section of chart E (Fig. 5) the second section is divided into one group, 130, of twelve pupils and one group, 140, of four pupils and the indicated distribution and exchange of books and stereographs or of stereoscopes will be understood from the preceding description.

Figs. 14 and 15 show typical charts N and O, respectively, for room having forty-two pupils arranged in seven rows of six pupils each. The chart N clearly shows by the symbols $a$, $b$, $c$ and $d$ thereon that it is for a topic or lesson having three duplicates of each of four different stereographs, and the chart O similarly shows by the use of the symbols $a$, $b$, $c$, $d$, $e$ and $f$ that it is for a topic or lesson having two duplicates of each of six different stereographs. The groupings and disposition of the stereographs are indicated and will be understood without further description; it being only important to call attention to the fact that the second section of chart N has two groups, 150 and 160 of eight members each, and two members, 151 and 161, one of which is provided with two stereographs while the other has the other two stereographs to be exchanged between them; and to the fact that the second section of chart O has one group, 170 of twelve pupils, and another group, 180, of six pupils, each of which latter is provided with a stereograph and stereoscope.

Fig. 16 is an example of a chart P for a room having 35 pupils, arranged in 7 rows of 5 members each and intended for a lesson or topic having six duplicate copies of each of two different stereographs. The only feature of this chart to which attention need be called is that in the second section, 190, there are three pupils represented at 191, 192 and 193, each of whom is provided with a set of the stereographs.

From the foregoing, the system devised will be readily understood and the importance thereof as well as the advantages of the charts will be appreciated; and it will also be understood that the charts illustrated merely exemplify some of the many various combinations which may be made and that the particular symbols described are merely those which at present are preferred. I therefore, intend that all matter contained in this description or shown in the accompanying drawings shall be interpreted as illustrative and not in a limiting sense. I desire it also to be understood that the language used in the following claims is intended to cover all of the generic and specific features of the invention herein described, and all statements of the scope of the invention, which, as a matter of language, might be said to fall therebetween.

Having now described my invention, what I claim as new and desire to secure by Letters Patent is:

1. An educational chart for use in teaching by means of stereographs, said chart having thereon indicia corresponding to the scholars in a class and disclosing the original distribution of the stereographs and the mode of exchanging them.

2. An educational chart for use in teaching by means of books and stereographs, said chart having thereon symbols representing the scholars in a class and each provided with symbols disclosing the original distribution of the stereographs and the mode of exchanging them.

3. An educational chart for use in teaching by means of books and stereographs, said chart having thereon indicia representing the scholars in the class divided into a plurality of groups of pupils and disclosing the original distribution of the stereographs among the members of the groups and the mode of exchanging the stereographs between said members.

4. An educational chart for use in teaching by means of books and stereographs, said chart having thereon symbols representing scholars in the class, each symbol having indicia related to the particular stereograph which is to be originally distributed to the scholar which it represents, said chart having indicia by which the dividing of the scholars in groups and the mode of exchanging stereographs among the members of the several groups is disclosed.

5. An educational chart for use in teaching by means of books and stereographs, said chart having thereon a section having a series of symbols representing the scholars in a class, said symbols grouped according to the number of stereographs in the lesson and provided with indicia appropriate to the several stereographs so as to graphically disclose the original distribution of the stereographs, said chart having means disclosing the groupings and the mode of exchanging stereographs between the members thereof.

6. An educational chart for use in teaching by means of books and stereographs, said chart having thereon a plurality of sections representing classes, each section provided with symbols representing the scholars in a class, and said sections severally provided with symbols appropriate to the stereographs, and symbols which divide the first named symbols into groups which accord with the number of different stereographs in the lesson and disclose the mode of exchanging the stereographs among the members of the several groups.

7. An educational chart for use in teaching, said chart having thereon indicia corresponding to the scholars in a class and disclosing the original distribution of an object from which instruction is given and the mode of exchanging said object.

8. An educational chart for use in teaching by means of objects to be exchanged between pupils, said chart having thereon symbols representing the scholars in a class divided into a plurality of groups and disclosing the original distribution of the object among the scholars or groups and the mode of exchanging the object between said scholars.

9. An educational chart for use in teaching by means of objects, said chart having thereon a section having a series of symbols representing the scholars in a class, said symbols grouped according to the number of objects in the lesson and provided with indicia appropriate to the several objects so as to graphically disclose the original distribution of the objects, said chart having means disclosing the groupings and the mode of exchanging objects between the scholars.

10. An educational chart for use in teaching by means of pictures, said chart having thereon indicia representing the scholars in a class divided into a plurality of groups of scholars and disclosing the original distribution of the pictures among members of the group and the mode of exchanging pictures between said members.

11. An educational chart for use in teaching, said chart having thereon indicia disclosing the original distribution of an object from which instruction is given and the mode of exchanging said object.

In witness whereof I have hereunto set my hand at the city, county and State of New York, this 19th day of July, 1907.

ALBERT E. OSBORNE.

In presence of—
JOHN J. RANAGAN,
I. RICHARDS.